Dec. 1, 1964    L. E. GOULD    3,158,958

SOIL TREATING METHOD

Original Filed June 29, 1962

INVENTOR:
L. E. GOULD
BY: *John R. Wilkema*
HIS ATTORNEY

United States Patent Office 3,158,958
Patented Dec. 1, 1964

3,158,958
SOIL TREATING METHOD
Lincoln E. Gould, Belvedere, Calif., assignor to Shell Oil Company, New York, N.Y., a corporation of Delaware
Original application June 29, 1962, Ser. No. 206,417. Divided and this application Dec. 23, 1963, Ser. No. 332,832
2 Claims. (Cl. 47—58)

This invention relates to the distribution of fertilizer to the soil and is more particularly concerned with the distribution of a fertilizer composition in which a normally solid material is dissolved in a liquid such as, for example, sulfur dissolved in liquid anhydrous ammonia. This application is a division of copending application S.N. 206,-417, filed June 29, 1962 and entitled "Soil Treating Apparatus," now Patent No. 3,148,642.

It has, for a period of time, been a practice to distribute ammonia to the soil for the purpose of supplying the necessary nitrogen. Such a process for soil fertilization is, for example, described in U.S. Patent 2,285,932, dated June 9, 1942 to F. H. Leavitt, wherein ammonia gas is passed directly into and under the surface of the soil in such controlled amounts that burning of the vegetation is avoided. Recently, it has been proposed to add to the soil amounts of sulfur along with the ammonia. For this purpose ammonium polysulfide solution has been added with some success. Another proposal has been to apply a dilute ammonia solution with finely divided sulfur in suspension to the soil.

Another recent system includes the dissolving of elemental sulfur in liquid anhydrous ammonia and distributing the ammonia with sulfur in solution through distribution conduits mounted on suitable cultivating tool shanks or blades. It has been found that while distribution of the ammonia-sulfur composition can effectively be made that great care must be taken to ensure that precipitation of sulfur be reduced to a minimum and that the conduits carrying the solution must be at all times kept under such pressure and temperature conditions that the ammonia remains in the liquid form within the dispensing equipment.

It is an object of this invention to provide a means whereby the apparatus for distributing ammonia-sulfur can be improved so that plugging of lines due to sulfur precipitation can be avoided.

A further object of this invention is to provide a method whereby the flushing out of ammonia-sulfur injection apparatus can be readily effected.

According to the invention a method is provided for introducing into the ground a volatile liquid containing dissolved therein a material subject to deposition upon evaporation of the liquid. Broadly the method comprises first confining the liquid and material within a pressure-tight vessel of sufficient volume to contain therein said liquid in both condensed and vaporized form and introducing the condensed form of the liquid, with the material dissolved therein, into distribution means leading to the ground. After the desired amount of liquid and material is fed to the ground, the method is completed by terminating the introduction of liquid and material into the ground and introducing the vaporized form of the liquid in the vessel into the distribution means to purge the material therefrom.

The further advantages and details of the invention will be more readily understood from the following description of a specific embodiment. Throughout the description, reference is made to the accompanying drawing of which:

Figure 2:
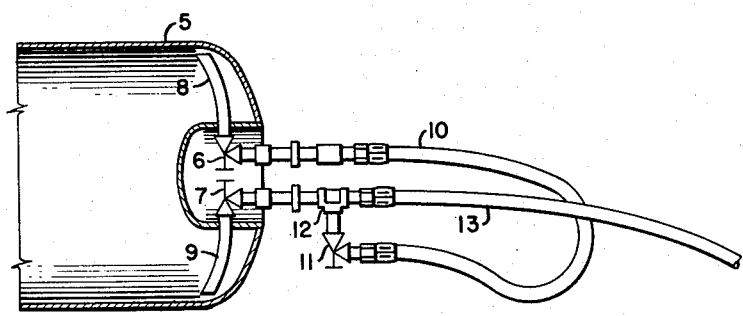
FIGURE 2 is an elevation view partially in section of part of an applicator cylinder included in FIGURE 1 showing its associated conduits.
Figure 1:
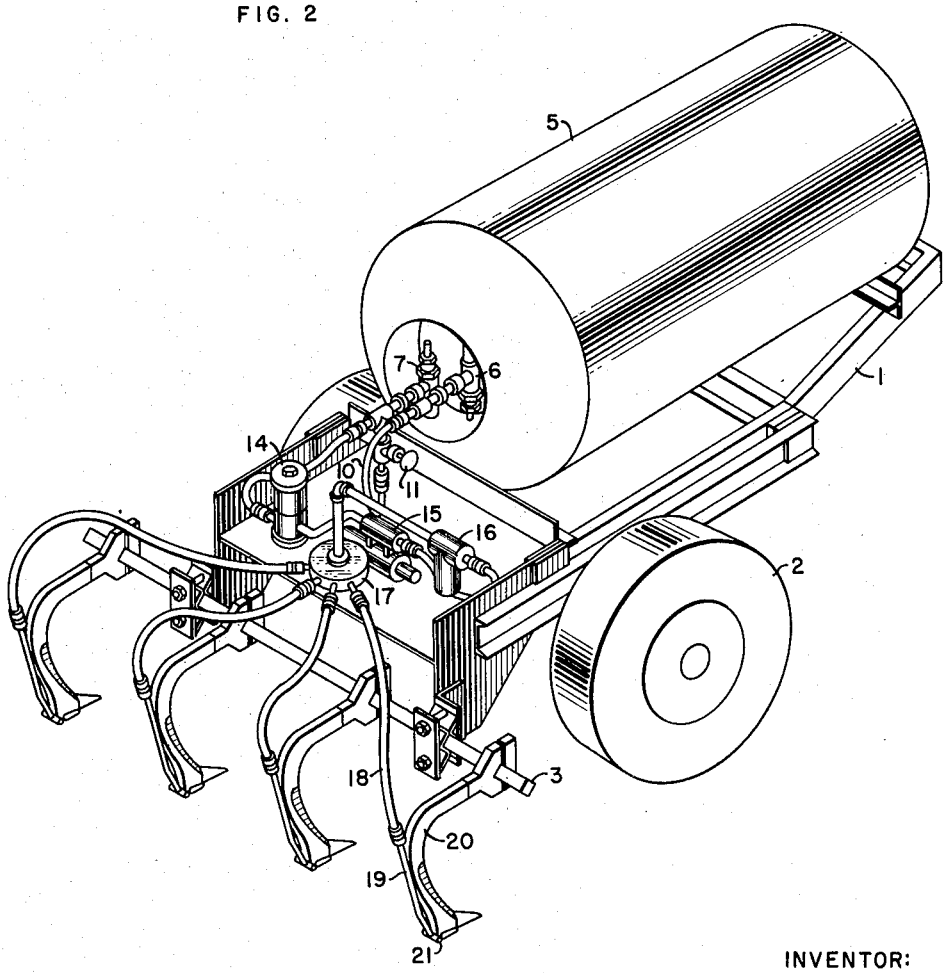
FIGURE 1 is a perspective view of a trailer equipped with ammonia-sulfur dispensing means adapted to accomplish the method of the invention.

Referring to FIGURE 1, numeral 1 represents a trailer having wheels 2 and suitable mechanism (not shown) for changing the elevation of the frame and its tool bar 3 with respect to the wheels 2. The trailer carries a pressure-tight cylinder 5 containing a liquid anhydrous ammonia-sulfur solution under pressure. As will be seen more readily by referring to FIGURE 2 the cylinder 5 is provided at one end with two valves 6 and 7. Valve 6 leads to a pipe 8 inside the cylinder 5 terminating close to the upper part of its wall. A second valve 7 leads to a second pipe 9 inside the cylinder terminating close to the lower part of the wall, diametrically opposite the termination of the first-mentioned pipe 8. The outer side of the valve 6 is connected to a pressure hose 10 terminating in a valve 11. The outer side of the valve 7 is connected to a T piece 12 which in turn is connected to pressure hose 13 leading to a filter unit 14 shown in FIGURE 1. From the other side of the filter unit 14 piping leads to the inlet of a metering pump 15. From the outlet side of the metering pump 15 piping leads by way of a second filter unit 16 to a distributor 17. Multiple pressure hoses 18 lead from the distributor 17 to pipes 19 attached to the rear of injection blades 20. The lower ends of the pipes 19 are provided with laterally directed outlets 21. The metering pump 15 is preferably driven by means of gearing or other drive means connected to a wheel 2 of the trailer. In operation the cylinder 5 containing the liquid anhydrous ammonia-sulfur solution is mounted horizontally on the trailer and is so oriented that the internal pipes 8 and 9 have their terminal ends vertically above each other. By opening valve 7, liquid anhydrous ammonia-sulfur solution will pass through the hose 13 and filter 14, metering means 15, filter 16 to the distributor 17 and so to the injector tubes 19.

As will be understood, with the injection blades lowered and the trailer moved over the ground by being pulled by a suitable tractor unit, the ammonia-sulfur solution will be passed into the soil at the required depth and at a desired metered rate.

After a field has been fertilized according to the program, it is desirable to shut off the flow of ammonia-sulfur solution. This is done by closing the valve 7 on the cylinder 5. The valve 6 and the valve 11 are then opened. By this means ammonia gas from above the surface of the liquid ammonia-sulfur solution in the cylinder is led under pressure into the piping system. The ammonia gas under pressure passing through the piping will push ahead of it the ammonia-sulfur solution in the apparatus thus effectively purging it. By providing that the hoses 18 connecting the distributor 17 to the injector pipes 19 are made of a flexible transparent material it is possible for the operator to observe, by the change in color, when the flushing of the ammonia-sulfur from the piping has been completed. Observation of the material emitted from ends of the injection shank will also indicate when flushing is complete.

Instead of a metering pump 15 shown in the drawing, it will be appreciated other metering and regulating means such as an orifice of specified restricted dimension could be employed as is a common practice in the distribution of anhydrous ammonia to the soil. Besides being useful in the distribution of ammonia-sulfur to the soil, the invention could be used in the distribution of ammonia-sulfur to irrigation water.

It will thus be seen by those skilled in the art that an efficient and ready method is provided by the invention for the flushing of material from ammonia-sulfur injection apparatus and thus preventing the costly and time-consuming shutdowns of the injecting operations. The method is provided without the necessity of providing auxiliary sources of flushing fluid and the apparatus that would be necessary to facilitate the operation of such sources.

I claim as my invention:

1. In the introduction into the ground of a volatile liquid containing dissolved therein a material subject to deposition upon evaporation of said liquid, the method of flushing for preventing clogging of the distribution system which comprises:

(*a*) confining said liquid and material within a pressure-tight vessel of sufficient volume to contain said liquid in both condensed and vaporized form;

(*b*) introducing the condensed form of said liquid with the material dissolved therein from said vessel into distribution means leading to the ground;

(*c*) terminating the introduction of said liquid with the material dissolved therein; and, (*d*) introducing the vaporized form of the liquid from said vessel into the distribution means and thereby purging said material therefrom.

2. A method according to claim 1 wherein the volatile liquid is anhydrous ammonia and the material is sulfur.

References Cited by the Examiner

UNITED STATES PATENTS

| | | | |
|---|---|---|---|
| 2,905,117 | 9/59 | Dugan | 111—7 |
| 3,070,434 | 12/62 | Turner et al. | 71—54 |
| 3,079,245 | 2/63 | Young | 71—54 |

ABRAHAM G. STONE, *Primary Examiner.*